US006090470A

United States Patent [19]

Bennett

[11] Patent Number: 6,090,470

[45] Date of Patent: Jul. 18, 2000

[54] MOUNTING SHEET

[76] Inventor: James Bennett, 14 Polworth Road, London, England SW16 2EU, United Kingdom

[21] Appl. No.: 09/018,996

[22] Filed: Feb. 5, 1998

[51] Int. Cl.[7] ...................... B32B 23/02

[52] U.S. Cl. ...................... 428/194; 428/195; 428/192; 428/202; 156/383; 156/505

[58] Field of Search ...................... 355/39, 77, 132, 355/40, 75, 133; 493/320, 325, 379, 386, 324, 331, 334, 375, 383, 216; 156/505, 383, 379.8; 428/194, 195, 198, 202, 355 RA

[56] References Cited

U.S. PATENT DOCUMENTS

| | | | |
|---|---|---|---|
| 4,975,735 | 12/1990 | Bright et al. | 355/75 |
| 5,087,238 | 2/1992 | Olson | 693/379 |
| 5,352,314 | 10/1994 | Coplan | 156/234 |

*Primary Examiner*—Merrick Dixon

[57] ABSTRACT

A new mounting sheet for mounting items such as small note sheets, business cards, and receipts thereon for permitting easy scanning of the items by a scanning device, such as a computer scanning devices and photocopying devices. The inventive device includes a sheet having an upper surface, and a pair of spaced apart lateral edges and a pair of spaced apart longitudinal edges extending between the lateral edges. Provided on the upper surface of the sheet are a plurality of elongate adhesion strips arranged in a grid arrangement on the upper surface of the sheet such that the grid arrangement has a plurality of laterally extending adhesion strips and a plurality of longitudinally extending adhesion strips. The lengths of the laterally extending adhesion strips are extended between the longitudinal edges of the sheet while the lengths of the longitudinally extending adhesion strips are extended between the lateral edges of the sheet. The grid arrangement of the adhesion strips defines a plurality of non-adhesive regions on the upper surface of the sheet which are arranged in a plurality of laterally extending rows and longitudinally extending columns.

14 Claims, 2 Drawing Sheets

MOUNTING SHEET

BACKGROUND OF THE INVENTION

1. Field of the Invention

The present invention relates to scanning holders and more particularly pertains to a new jimmit for mounting items such as small note sheets, business cards, and receipts thereon for permitting easy scanning of the items by a scanning device, such as a computer scanning devices and photocopying devices.

2. Description of the Prior Art

The use of scanning holders is known in the prior art. More specifically, scanning holders heretofore devised and utilized are known to consist basically of familiar, expected and obvious structural configurations, notwithstanding the myriad of designs encompassed by the crowded prior art which have been developed for the fulfillment of countless objectives and requirements.

Known prior art scanning holders include U.S. Pat. Nos. 5,087,238; 4,975,735; 5,331,380; 5,352,314; 4,586,651; and U.S. Pat. No. Des. 337,483.

While these devices fulfill their respective, particular objectives and requirements, the aforementioned patents do not disclose a new mounting sheet. The inventive device includes a sheet having an upper surface, and a pair of spaced apart lateral edges and a pair of spaced apart longitudinal edges extending between the lateral edges. Provided on the upper surface of the sheet are a plurality of elongate adhesion strips arranged in a grid arrangement on the upper surface of the sheet such that the grid arrangement has a plurality of laterally extending adhesion strips and a plurality of longitudinally extending adhesion strips. The lengths of the laterally extending adhesion strips are extended between the longitudinal edges of the sheet while the lengths of the longitudinally extending adhesion strips are extended between the lateral edges of the sheet. The grid arrangement of the adhesion strips defines a plurality of non-adhesive regions on the upper surface of the sheet which are arranged in a plurality of laterally extending rows and longitudinally extending columns.

In these respects, the mounting sheet according to the present invention substantially departs from the conventional concepts and designs of the prior art, and in so doing provides an apparatus primarily developed for the purpose of mounting items such as small note sheets, business cards, and receipts thereon for permitting easy scanning of the items by a scanning device, such as a computer scanning devices and photocopying devices.

SUMMARY OF THE INVENTION

In view of the foregoing disadvantages inherent in the known types of scanning holders now present in the prior art, the present invention provides a new mounting sheet construction wherein the same can be utilized for mounting items such as small note sheets, business cards, and receipts thereon for permitting easy scanning of the items by a scanning device, such as a computer scanning devices and photocopying devices.

The general purpose of the present invention, which will be described subsequently in greater detail, is to provide a new mounting sheet apparatus and method which has many of the advantages of the scanning holders mentioned heretofore and many novel features that result in a new mounting sheet which is not anticipated, rendered obvious, suggested, or even implied by any of the prior art scanning holders, either alone or in any combination thereof.

To attain this, the present invention generally comprises a sheet having an upper surface, and a pair of spaced apart lateral edges and a pair of spaced apart longitudinal edges extending between the lateral edges. Provided on the upper surface of the sheet are a plurality of elongate adhesion strips arranged in a grid arrangement on the upper surface of the sheet such that the grid arrangement has a plurality of laterally extending adhesion strips and a plurality of longitudinally extending adhesion strips. The lengths of the laterally extending adhesion strips are extended between the longitudinal edges of the sheet while the lengths of the longitudinally extending adhesion strips are extended between the lateral edges of the sheet. The grid arrangement of the adhesion strips defines a plurality of non-adhesive regions on the upper surface of the sheet which are arranged in a plurality of laterally extending rows and longitudinally extending columns.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mounting sheet apparatus and method which has many of the advantages of the scanning holders mentioned heretofore and many novel features that result in a new mounting sheet which is not anticipated, rendered obvious, suggested, or even implied by any of the prior art scanning holders, either alone or in any combination thereof.

It is another object of the present invention to provide a new mounting sheet which may be easily and efficiently manufactured and marketed.

It is a further object of the present invention to provide a new mounting sheet which is of a durable and reliable construction.

An even further object of the present invention is to provide a new mounting sheet which is susceptible of a low cost of manufacture with regard to both materials and labor, and which accordingly is then susceptible of low prices of sale to the consuming public, thereby making such mounting sheet economically available to the buying public.

Still yet another object of the present invention is to provide a new mounting sheet which provides in the apparatuses and methods of the prior art some of the advantages thereof, while simultaneously overcoming some of the disadvantages normally associated therewith.

Still another object of the present invention is to provide a new mounting sheet for mounting items such as small note sheets, business cards, and receipts thereon for permitting easy scanning of the items by a scanning device, such as a computer scanning devices and photocopying devices.

Yet another object of the present invention is to provide a new mounting sheet which includes a sheet having an upper surface, and a pair of spaced apart lateral edges and a pair of spaced apart longitudinal edges extending between the lateral edges. Provided on the upper surface of the sheet are a plurality of elongate adhesion strips arranged in a grid arrangement on the upper surface of the sheet such that the grid arrangement has a plurality of laterally extending adhesion strips and a plurality of longitudinally extending adhesion strips. The lengths of the laterally extending adhesion strips are extended between the longitudinal edges of the sheet while the lengths of the longitudinally extending adhesion strips are extended between the lateral edges of the sheet. The grid arrangement of the adhesion strips defines a plurality of non-adhesive regions on the upper surface of the sheet which are arranged in a plurality of laterally extending rows and longitudinally extending columns.

Still yet another object of the present invention is to provide a new mounting sheet that detachably holds items to the upper surface of the sheet so that the items may be easily scanned by an insertion-type or feeder-type scanning device.

Even still another object of the present invention is to provide a new mounting sheet that permits convenient aligning of small items such as receipts on to a sheet to reduce the time needed to scan the items with a scanner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
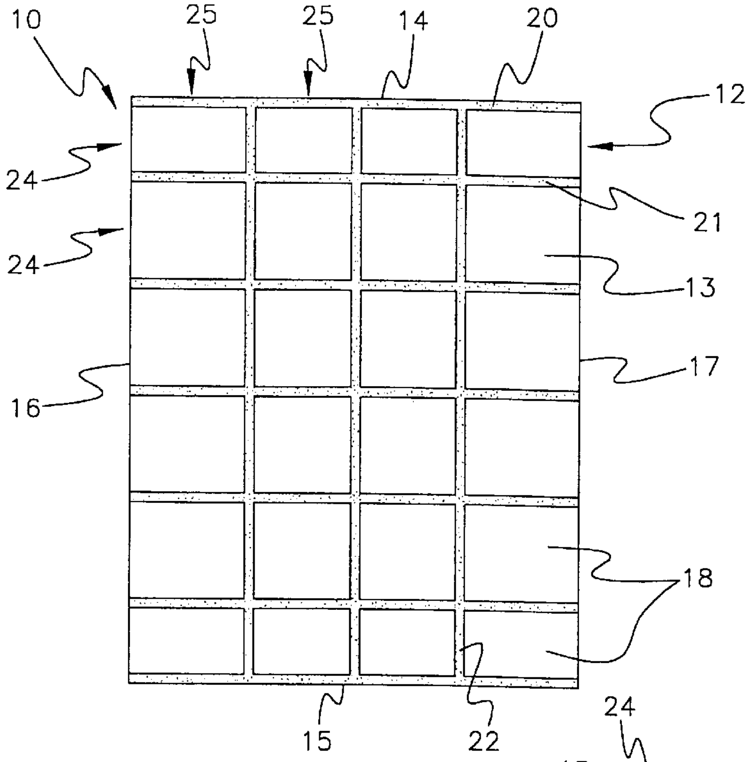
FIG. 1 is a schematic top plan view of a new mounting sheet according to the present invention.
Figure 2:
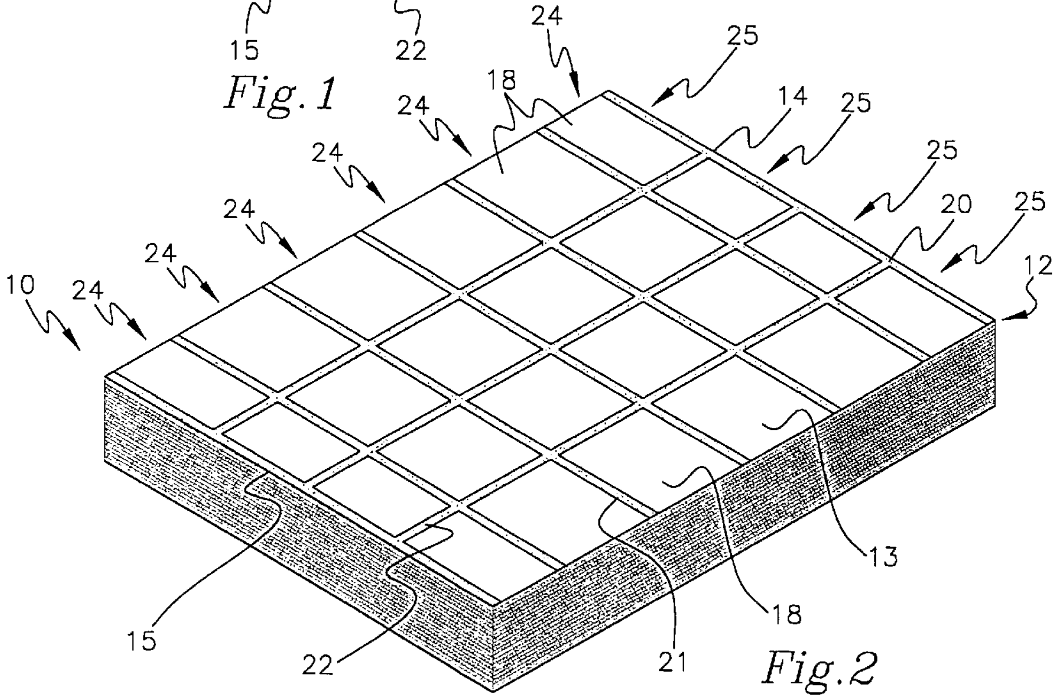
FIG. 2 is a schematic perspective view of a stack of the present invention.
Figure 3:
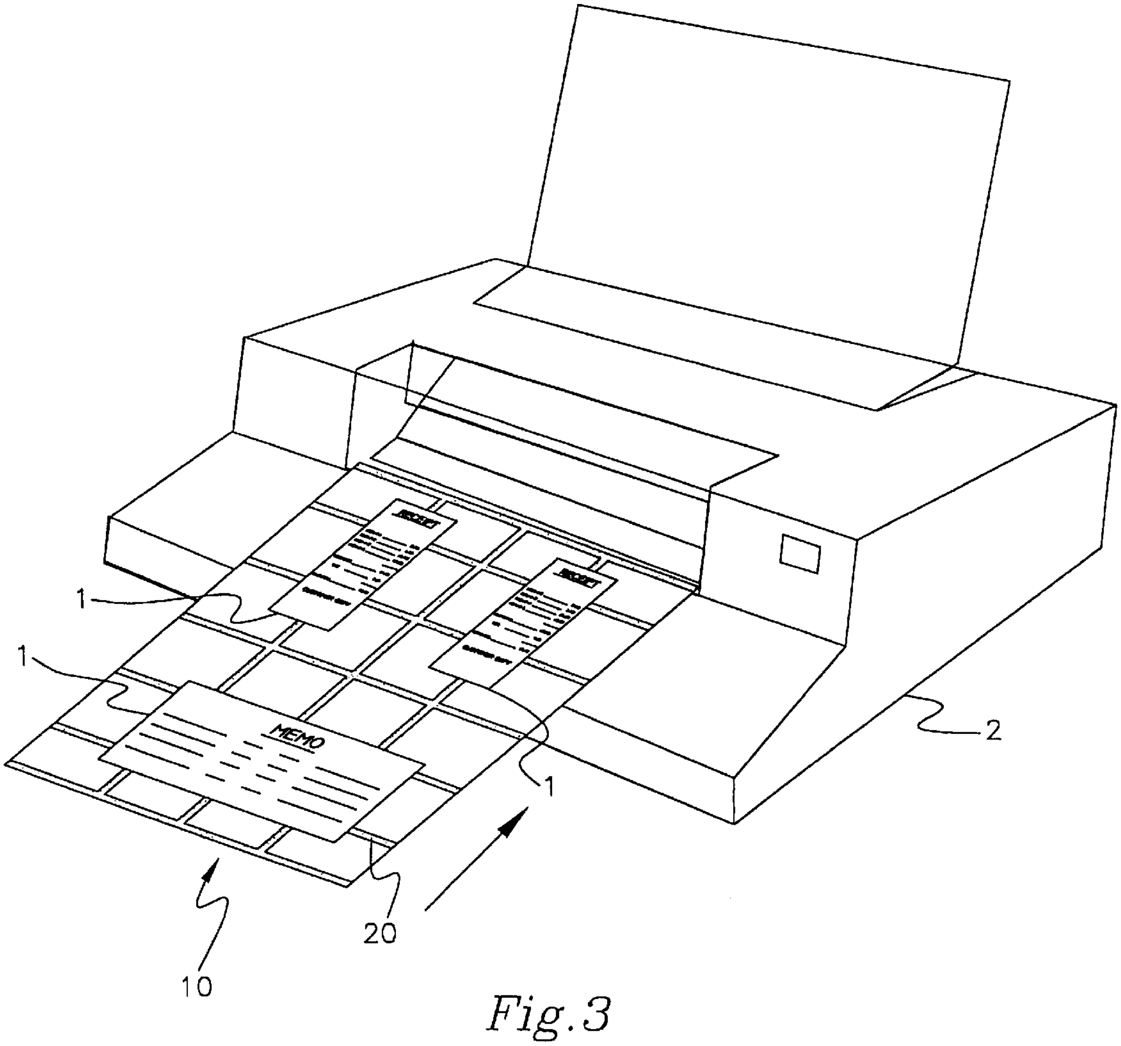
FIG. 3 is a schematic perspective view of the present invention in use being fed into an insertion feed type scanning device with small sheet items on the upper surface of the mounting sheet.

With reference now to the drawings, and in particular to FIGS. 1 through 3 thereof, a new mounting sheet embodying the principles and concepts of the present invention and generally designated by the reference numeral 10 will be described.

As best illustrated in FIGS. 1 through 3, the mounting sheet 10 generally comprises a sheet 12 having an upper surface 13, and a pair of spaced apart lateral edges 14,15 and a pair of spaced apart longitudinal edges 16,17 extending between the lateral edges 14,15. Provided on the upper surface 13 of the sheet 12 are a plurality of elongate adhesion strips 20 arranged in a grid arrangement on the upper surface 13 of the sheet 12 such that the grid arrangement has a plurality of laterally extending adhesion strips 21 and a plurality of longitudinally extending adhesion strips 22. The lengths of the laterally extending adhesion strips 21 are extended between the longitudinal edges 16,17 of the sheet 12 while the lengths of the longitudinally extending adhesion strips 22 are extended between the lateral edges 14,15 of the sheet 12. The grid arrangement of the adhesion strips 20 defines a plurality of non-adhesive regions 18 on the upper surface 13 of the sheet 12 which are arranged in a plurality of laterally extending rows 24 and longitudinally extending columns 25.

With reference to FIG. 3, the mounting sheet 12 is designed for mounting items 1, such as small note sheets and receipts, thereon for permitting easy scanning thereof by a scanning device 2, such as computer scanning devices and photocopying devices, especially those types of scanning devices using an insertion type feed device.

As best illustrated in FIG. 1, the sheet 12 is generally rectangular and has an upper surface 13, and a pair of spaced apart lateral edges 14,15 and a pair of spaced apart longitudinal edges 16,17 extending between the lateral edges 14,15. Preferably, the sheet is made of paper however, any appropriate material may be used. The sheet 12 has a longitudinal length which is defined between the lateral edges 14,15 and a lateral length which is defined between the longitudinal edges 16,17 of the sheet 12. Ideally, the longitudinal length of the sheet 12 is greater than the lateral length of the sheet 12.

Provided on the upper surface 13 of the sheet 12 are a plurality of elongate adhesion strips 20 each having a pair of opposite ends, and a length defined between the opposite ends of the adhesion strip 20. Each of the adhesion strips 20 is made from an adhesive preferably of the type commonly found on self-stick removable notes of the type sold under the trade name of "Post-it" by 3M of St. Paul, Minn. 55144-1000. The adhesive permits removable adhesive coupling of other sheets of paper 1 such as receipts and small notes to the upper surface 13 of the sheet 12.

As illustrated in FIG. 1, the adhesion strips 20 are arranged in a grid arrangement on the upper surface 13 of the sheet 12 such that the grid arrangement has a plurality of laterally extending adhesion strips 21 and a plurality of longitudinally extending adhesion strips 22. Preferably, the laterally extending adhesion strips 21 are substantially perpendicular to the longitudinally extending adhesion strips 22. Illustratively, for a sheet 12 constructed in the sized of A4 paper, the grid arrangement has seven laterally extending strips 21 and three longitudinally extending adhesion strips 22.

The lengths of the laterally extending adhesion strips 21 extend between the longitudinal edges 16,17 of the sheet 12 such that the ends of the adhesion strips 21 are positioned adjacent their respective longitudinal edge of the sheet 12. Preferably, as illustrated in FIG. 1, one of the laterally extending adhesion strips 21 is positioned adjacent one of the lateral edges 14,15 of the sheet 12 while another of the laterally extending adhesion strips 21 is positioned adjacent another of the lateral edges 14,15 of the sheet 12.

In a similar fashion, the lengths of the longitudinally extending adhesion strips 22 extend between the lateral edges 14,15 of the sheet 12 such that the ends of the adhesion strips 22 are positioned adjacent a respective the lateral edge of the sheet 12. In the ideal embodiment of the invention, one of the longitudinally extending adhesion strips 22 is centrally positioned along the longitudinal midpoint axis of the sheet 12 which is located between the longitudinal edges 16,17 of the sheet 12 and intersecting each of the lateral edges 14,15 of the sheet 12 at a midpoint along there respective lengths.

The grid arrangement of the adhesion strips 20 defines a plurality of generally rectangular non-adhesive regions 18 on the upper surface 13 of the sheet 12 which are arranged in a plurality of laterally extending rows 24 and longitudinally extending columns 25. The longitudinally extending columns 25 of the non-adhesive regions 18 are extended between the lateral edges 14,15 of the sheet 12 while the laterally extending rows 24 of the non-adhesive regions 18 are extended between the longitudinal edges 16,17 of the sheet 12. Preferably, the laterally extending rows of the non-adhesive regions 18 are extended between the longitudinal edges 16,17 of the sheet 12 such that one of the non-adhesive regions 18 of each of the rows is positioned adjacent one of the longitudinal edges 16,17 and another of the non-adhesive regions 18 of each of the rows is positioned adjacent another of the longitudinal edges 16,17 of the sheet 12.

In use, small sheet items 1 are positioned on the upper surface 13 of the sheet and adhered to the sheet 12 by the adhesion strips 20. The sheet 12 with the small sheet items I may now be scanned by a scanning device 2, especially an insertion feed type of scanning device as illustrated in FIG. 3.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mounting sheet for mounting items thereon for permitting scanning thereof by a scanning device, said mounting sheet comprising:

a sheet having an upper surface, and a pair of spaced apart lateral edges and a pair of spaced apart longitudinal edges being extended between said lateral edges;

a plurality of elongate adhesion strips on said upper surface of said sheet for removably adhering items to said upper surface of said sheet between said lateral and longitudinal edges, each adhesion strip having a pair of opposite ends, and a length being defined between said opposite ends of said adhesion strip, each of said adhesion strips comprising an adhesive of a type adapted to removably adhere to items placed against said adhesion strip to removably secure the items to the sheet;

said adhesion strips being arranged in a grid arrangement on said upper surface of said sheet such that said grid arrangement has a plurality of said adhesion strips extending laterally between said longitudinal edges of said sheet and a plurality of said adhesion strips extending longitudinally between said lateral edges of said sheet;

said lengths of said laterally extending adhesion strips being extended between said longitudinal edges of said sheet;

said lengths of said longitudinally extending adhesion strips being extended between said lateral edges of said sheet;

said grid arrangement of said adhesion strips dividing said upper surface into a plurality of non-adhesive regions on said upper surface of said sheet, said non-adhesive regions being arranged in a plurality of laterally extending rows and longitudinally extending columns;

said longitudinally extending columns of said non-adhesive regions being extended between said lateral edges of said sheet; and said laterally extending rows of said non-adhesive regions being extended between said longitudinal edges of said sheet.

2. The mounting sheet of claim 1, wherein said sheet is generally rectangular.

3. The mounting sheet of claim 1, wherein said sheet has a longitudinal length being defined between said lateral edges of said sheet, wherein said sheet has a lateral length being defined between said longitudinal edges of said sheet, wherein said longitudinal length of said sheet is greater than said lateral length of said sheet.

4. The mounting sheet of claim 1, wherein said sheet comprises paper.

5. The mounting sheet of claim 1, wherein said laterally extending adhesion strips are oriented substantially perpendicular to said longitudinally extending adhesion strips, wherein said non-adhesive regions are generally rectangular.

6. The mounting sheet of claim 5, wherein said grid arrangement has seven laterally extending strips, and wherein said grid arrangement has three longitudinally extending adhesion strips.

7. The mounting sheet of claim 1, wherein said lengths of said laterally extending adhesion strips are extended between said longitudinal edges of said sheet such that said ends of said adhesion strips are positioned adjacent a respective said longitudinal edge of said sheet, and wherein said lengths of said longitudinally extending adhesion strips are extended between said lateral edges of said sheet such that said ends of said adhesion strips are positioned adjacent a respective said lateral edge of said sheet.

8. The mounting sheet of claim 1, wherein one of said laterally extending adhesion strips is positioned adjacent one of said lateral edges of said sheet, and another of said laterally extending adhesion strips is positioned adjacent another of said lateral edges of said sheet.

9. The mounting sheet of claim 1, wherein said sheet has a midpoint axis located between said longitudinal sides of said sheet, said midpoint axis intersecting each of said lateral edges of said sheet at a midpoint along there respective lengths, and wherein one of said longitudinally extending adhesion strips is centrally positioned along said midpoint axis of said sheet.

10. The mounting sheet of claim 1, wherein said laterally extending rows of said non-adhesive regions are extended between said longitudinal edges of said sheet such that one of said non-adhesive regions of each of said rows is positioned adjacent one of said longitudinal edges and another of said non-adhesive regions of each of said rows is positioned adjacent another of said longitudinal edges of said sheet.

11. A mounting sheet for mounting items thereon for permitting scanning thereof by a scanning device, said mounting sheet comprising:

a sheet being generally rectangular and having an upper surface, and a pair of spaced apart lateral edges and a pair of spaced apart longitudinal edges being extended between said lateral edges, said sheet having a longitudinal length being defined between said lateral edges of said sheet, said sheet having a lateral length being defined between said longitudinal edges of said sheet, wherein said longitudinal length of said sheet being greater than said lateral length of said sheet, wherein said sheet comprises paper;

a plurality of elongate adhesion strips on said upper surface of said sheet for removably adhering items to said upper surface of said sheet between said lateral and longitudinal edges, each adhesion strip having a pair of opposite ends, and a length being defined between said opposite ends of said adhesion strip, each of said adhesion strips comprising an adhesive, said adhesive being of a type adapted to removably adhere to items placed against said adhesion strip to removably secure the items to the sheet;

said adhesion strips being arranged in a grid arrangement on said upper surface of said sheet such that said grid arrangement has a plurality of said adhesion strips extending laterally between said longitudinal edges of said sheet and a plurality of said adhesion strips extending longitudinally between said lateral edges of said sheet, each of said laterally extending adhesion strips being substantially perpendicular to said longitudinally extending adhesion strips, wherein said grid arrangement has seven laterally extending strips, and wherein said grid arrangement has three longitudinally extending adhesion strips;

said lengths of said laterally extending adhesion strips being extended between said longitudinal edges of said sheet such that said ends of said adhesion strips are positioned adjacent a respective said longitudinal edge of said sheet;

one of said laterally extending adhesion strips being positioned adjacent one of said lateral edges of said sheet, another of said laterally extending adhesion strips being positioned adjacent another of said lateral edges of said sheet;

said lengths of said longitudinally extending adhesion strips being extended between said lateral edges of said sheet such that said ends of said adhesion strips are positioned adjacent a respective said lateral edge of said sheet;

said sheet having a midpoint axis located between said longitudinal sides of said sheet, said midpoint axis intersecting each of said lateral edges of said sheet at a midpoint along there respective lengths, one of said longitudinally extending adhesion strips being centrally positioned along said midpoint axis of said sheet;

said grid arrangement of said adhesion strips dividing said upper surface into a plurality of generally rectangular non-adhesive regions on said upper surface of said sheet, said non-adhesive regions being arranged in a plurality of laterally extending rows and longitudinally extending columns;

said longitudinally extending columns of said non-adhesive regions being extended between said lateral edges of said sheet; and said laterally extending rows of said non-adhesive regions being extended between said longitudinal edges of said sheet such that one of said non-adhesive regions of each of said rows is positioned adjacent one of said longitudinal edges and another of said non-adhesive regions of each of said rows is positioned adjacent another of said longitudinal edges of said sheet.

12. The mounting sheet of claim 1 including three longitudinally extending adhesion strips and three laterally extending adhesion strips such that a row of two non-adhesive regions and a column of two non-adhesive regions is formed, one of said longitudinally extending adhesion strips extending along each of said longitudinal edges, and one of said laterally extending adhesion strips extending along each of said lateral edges.

13. The mounting sheet of claim 12 wherein one of the longitudinally extending adhesion strips and one of the laterally extending adhesion strips intersect at a central location on said upper surface of said sheet.

14. The mounting sheet of claim 1 wherein each of said non-adhesive regions is surrounded by said adhesive strips.

* * * * *